United States Patent [19]

Harbaugh

[11] Patent Number: 5,765,434
[45] Date of Patent: Jun. 16, 1998

[54] CAPACITIVE WATER HEIGHT GAUGE AND METHOD

[75] Inventor: Steven K. Harbaugh, Castro Valley, Calif.

[73] Assignee: Scepter Scientific, Inc., Pleasanton, Calif.

[21] Appl. No.: 683,267

[22] Filed: Jul. 18, 1996

[51] Int. Cl.⁶ ............................................ G01F 23/00
[52] U.S. Cl. ............................................. 73/304 C
[58] Field of Search ............................. 73/304 C, 73; 361/284; 324/687, 688, 689

[56] References Cited

U.S. PATENT DOCUMENTS

| Re. 34,073 | 9/1992 | Suzuki | 324/687 |
|---|---|---|---|
| 3,671,857 | 6/1972 | Bergmanis et al. | 324/687 |
| 3,728,897 | 4/1973 | Wallman | |
| 3,873,927 | 3/1975 | Overall | 328/4 |
| 3,879,644 | 4/1975 | Maltby | |
| 3,986,170 | 10/1976 | Overall et al. | 73/304 C |
| 4,639,831 | 1/1987 | Iyoda | 324/689 |
| 4,816,748 | 3/1989 | Tazawa et al. | 324/687 |
| 4,817,021 | 3/1989 | Sowerby et al. | 324/687 |
| 4,845,421 | 7/1989 | Howarth et al. | 324/688 |
| 5,175,505 | 12/1992 | Magenau et al. | 73/304 C |
| 5,182,947 | 2/1993 | Fidelak et al. | 73/304 C |
| 5,532,527 | 7/1996 | Zalter | |
| 5,613,399 | 3/1997 | Hannan et al. | 73/304 C |

*Primary Examiner*—Richard Chilcot
*Assistant Examiner*—Jewel Thompson
*Attorney, Agent, or Firm*—Flehr Hohbach Test Albritton & Herbert LLP

[57] ABSTRACT

Capacitive water height gauge and method in which a pair of electrically conductive plates are positioned side-by-side to form a capacitor having a capacitance which is dependent upon the dielectric properties of materials in a region above the plates. The plates are positioned beneath the body of water so that the capacitance is dependent upon the amount of water in the region above the plates, and that capacitance is monitored to determine the height of the water above the plates.

13 Claims, 2 Drawing Sheets

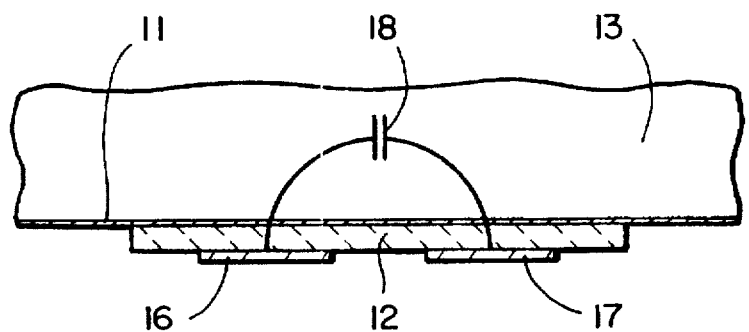
FIG_1
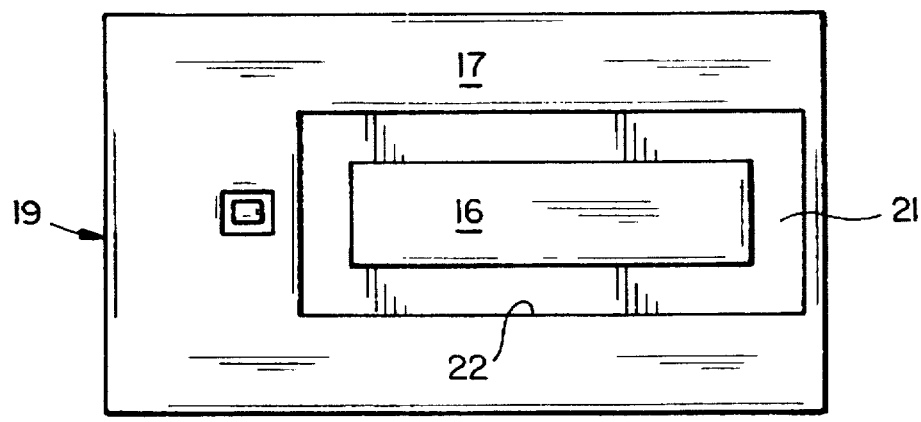
FIG_2
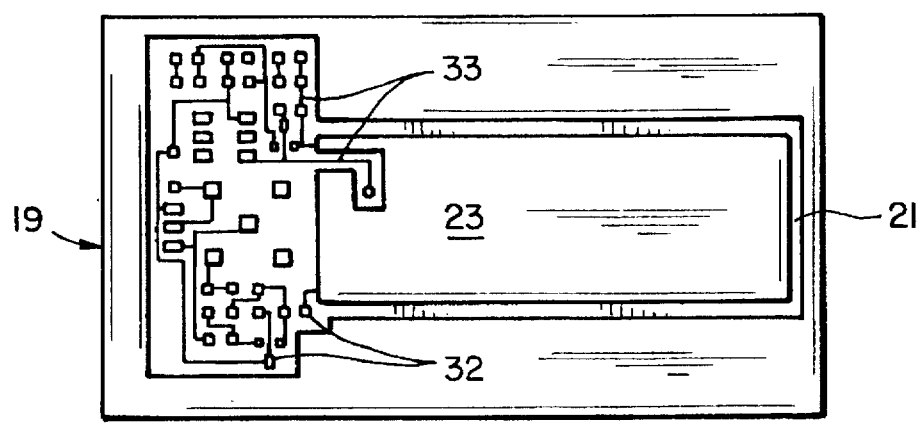
FIG_3

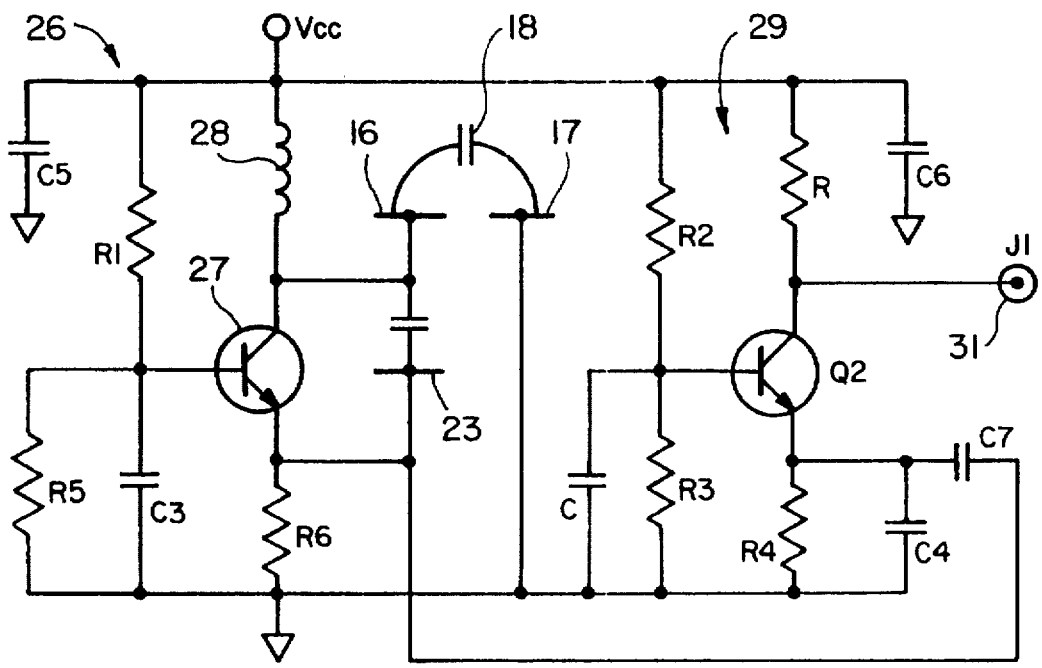
FIG_4
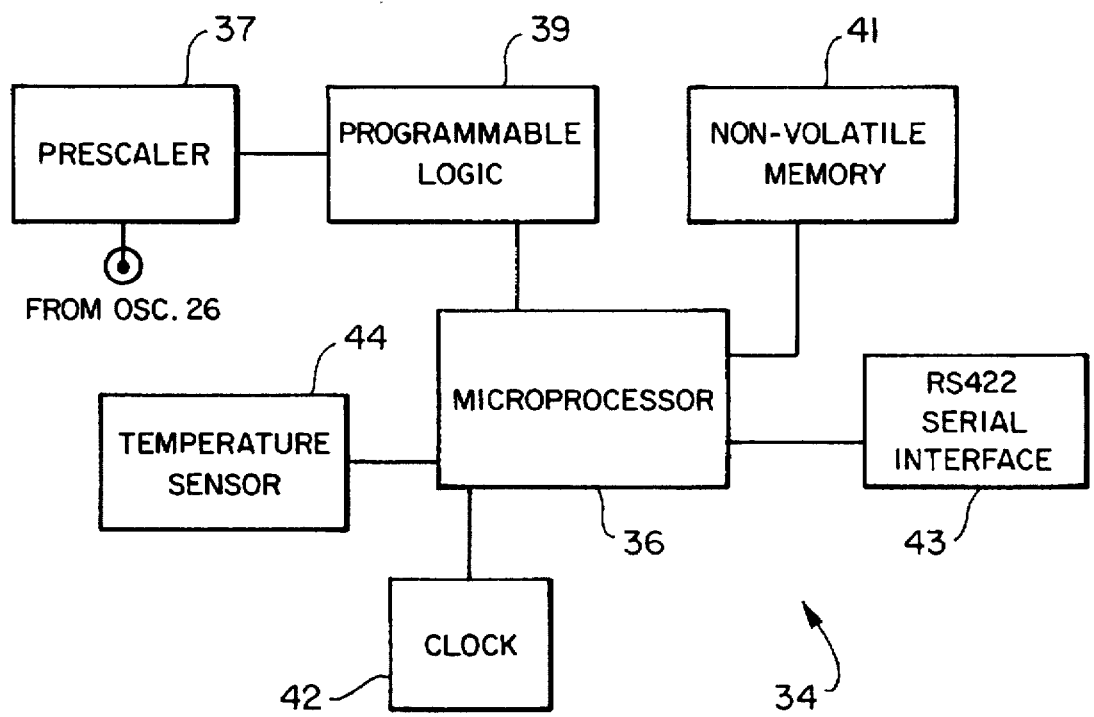
FIG_5

CAPACITIVE WATER HEIGHT GAUGE AND METHOD

This invention pertains generally to the water height measurement and, more particularly, to a water height gauge and method for use in applications such as the manufacture of paper.

In the manufacture of paper, a water-pulp slurry is poured onto a moving screen which is commonly referred to as the wire. The water passes through the wire, leaving a thin layer of pulp on the wire. The pulp is subsequently removed from the wire and further processed into paper. A vacuum is applied under the wire to control the rate of water removal. That rate is a major factor in determining the quality of the paper product, and it must be controlled in order to maintain uniformity of the paper.

Water height can be monitored at any point along the wire to determine if the water removal process is uniform and consistent. A water height measurement can also provide control information to the vacuum system in order to maintain the water height at a constant level.

One of the most common instruments heretofore used for measuring water height is the gamma gauge. That gauge is placed under the wire and measures photon backscatter which is proportional to the mass of the wire and the water slurry above the gauge. When the mass of the wire, the paper bias weight, and temperature are known, the water height or paper/water consistency can be calculated. The gamma gauge works well, but is relatively expensive and requires the use of a controlled radioactive source.

It is in general an object of the invention to provide a new and improved water height gauge and method.

Another object of the invention is to provide a water height gauge and method of the above character which do not require a radioactive source and are suitable for use in the paper industry.

Another object of the invention is to provide a water height gauge and method of the above character which are less expensive to implement than the gamma gauge which has heretofore been used in the paper industry and do not require a radioactive source.

These and other objects are achieved in accordance with the invention by providing a capacitive water height gauge and method in which a pair of electrically conductive plates are positioned side-by-side to form a capacitor having a capacitance which is dependent upon the dielectric properties of materials in a region above the plates. The plates are positioned beneath the body of water so that the capacitance is dependent upon the amount of water in the region above the plates, and that capacitance is monitored to determine the height of the water above the plates.

FIG. 1 is fragmentary cross-sectional view, somewhat schematic, of a paper making machine or mill having one embodiment of a water height gauge according to the invention.

FIG. 2 is a top plan view of the circuit board on which the sensing capacitor of the water height gauge in the embodiment of FIG. 1 is constructed.

FIG. 3 is a bottom plan view of the circuit board illustrated in FIG. 2.

FIG. 4 is a circuit diagram of an oscillator for use in the embodiment of FIG. 1.

FIG. 5 is a block diagram of a signal processor for use in the embodiment of FIG. 1.

In FIG. 1, the water height gauge is illustrated in connection with the pulping screen or wire 11 in the forming section of a paper making machine or mill. The wire rests upon the upper surface of a ceramic plate 12 which is chosen for its ability to resist wear as the wire moves over it. A slurry of pulp and water 13 is introduced above wire, and as the water passes through the wire, a layer of pulp is formed on the wire. As noted above, it is desirable to control the water height and drainage to maintain the uniformity of the paper.

A pair of electrically conductive plates 16, 17 are positioned side-by-side beneath the ceramic plate to form a capacitor 18 having a capacitance which is dependent upon the dielectric properties of materials in a hemispherical region above the plates. Since the dielectric of water is very much larger (50 to 80 times) than that of air, the capacitance will increase significantly as water replaces air in the region above the plates. The dielectric of water is also much larger than the dielectric of paper pulp, and in most cases where the consistency of the pulp/water slurry is mostly water, the capacitance is not affected significantly by the pulp.

As illustrated in FIGS. 2 and 3, in one presently preferred embodiment, the capacitor plates are fabricated from a printed circuit board 19. That board comprises a generally planar substrate 21 of nonconductive material, with layers of metal (e.g., copper) on the two surfaces of the substrate. In the embodiment illustrated, the board is glued to the lower surface of the ceramic plate. In another embodiment, the board and the ceramic plate are formed as single multilayer structure, with both the plate and the substrate being formed of a ceramic material.

Plates 16, 17 are formed on the upper surface of the substrate, with plate 16 being positioned concentrically within plate 17. In the embodiment shown, the two plates are generally rectangular, and inner plate 16 is disposed within a rectangular opening 22 in the outer plate. As discussed more fully hereinafter, the inner plate serves as a sensor plate, and the outer plate is grounded. A generally rectangular guard plate 23 is formed on the lower surface of the substrate in registration with the sensor plate to protect the sensor plate from external stray capacitances. In the embodiment illustrated, the guard plate is somewhat larger in lateral extent than the sensor plate and somewhat smaller than the opening in the outer plate.

The capacitor 18 formed by plates 16, 17 and the water above the plates is utilized a frequency determining element of an oscillator 26. As illustrated in FIG. 4, the oscillator is a Colpits oscillator which includes a transistor 27, with sensor plate 16 and an inductor 28 connected to the collector of the transistor and guard plate 23 connected to the emitter. The frequency at which the oscillator operates is determined by the parallel resonance of capacitor 18 and inductor 28. The value of the inductor is chosen to provide a nominal operating frequency of 100 MHz or higher. Frequencies of 100 MHz or higher are preferred because paper slurries generally contain a number of salts and are conductive at low frequencies. At frequencies of 100 MHz and above, ionic mobility is not sufficient to produce a significant measurement error due to water conductivity. An output buffer 29 delivers the signal from oscillator 26 to an output terminal 31.

The oscillator circuit is constructed on circuit board 19 along with the plates of the capacitor. For this purpose, pads 32 and traces 33 are formed in the metal foil on the lower side of the board at one end of the guard plate.

The signal produced by the oscillator varies in frequency in accordance with the capacitance of capacitor 18. That signal is processed to determine the height of the water beneath the plates. As illustrated in FIG. 5, the signal processor 34 includes a microprocessor 36 and a frequency prescaler 37 which divides the frequency of the oscillator signal down to a range that can be handled easily by the microprocessor. A programmable logic circuit 39 receives a clock signal from the microprocessor and returns a time base signal for counting the oscillator frequency. The microprocessor is interfaced to a non-volatile memory 41, an external clock 42 and an RS422 serial interface 43.

A table of oscillator frequencies and corresponding water heights is stored in non-volatile memory 41. Because of the location of the pulping wire and the configuration of the capacitor plates, the capacitance is not linearly proportional to the water height, and the table is generated empirically.

The signal processor also includes a temperature calibration table which is stored in the non-volatile memory and a temperature sensor 44 which monitors the temperature of the water and is interfaced with the microprocessor. The dielectric of water is dependent upon temperature, and that relationship is reflected in the calibration table.

If desired, the signal processor can be provided with a second frequency input and prescaler (not shown) which can serve as a reference channel for an external oscillator which is not subject to the effect of water capacitance. Such an oscillator can be used as a temperature and environmental reference for the capacitance measurement.

In use, the sensing unit consisting of capacitor 18 and oscillator 26 is mounted on the under side of ceramic plate 12 and connected to the remotely located signal processor 34 by a cable or other suitable link (not shown). The value of the capacitance, and hence the frequency of the oscillator signal, varies with the height or depth of the water above plates 16, 17. The microprocessor repetitively measures the frequency of the oscillator signal and the temperature from the sensor, and uses the tables stored in the non-volatile memory to convert the frequency measurement to water height data. That data is averaged over a programmable interval and output over serial interface 43 as a command to a servo controller (not shown) in the paper mill. The controller adjusts the rate at which the water is withdrawn through the wire to maintain the water at a predetermined level above the wire.

The invention has a number of important features and advantages. It provides a low cost water height gauge which can be used in the paper industry and does not require a radioactive source.

It is apparent from the foregoing that a new and improved water height gauge and method have been provided. While only certain presently preferred embodiments have been described in detail, as will be apparent to those familiar with the art, certain changes and modifications can be made without departing from the scope of the invention as defined by the following claims.

I claim:

1. In a gauge for monitoring the height of a body of water; a pair of electrically conductive plates disposed side-by-side to form a capacitor having a capacitance which is dependent upon the dielectric properties of materials in a region above the plates, means for positioning the plates beneath the body of water so that the capacitance is dependent upon the amount of water in the region above the plates, an oscillator which provides a signal having a frequency determined by the capacitance, and means for processing the oscillator signal to determine the height of the water above the plates.

2. The gauge of claim 1 wherein the means for processing the oscillator signal includes means for monitoring the frequency of the signal, a table of oscillator frequencies and corresponding water heights, and means for addressing the table in accordance with the frequency of the oscillator signal to determine the height of the water.

3. The gauge of claim 1 wherein the oscillator operates at frequencies on the order of 100 MHz and higher.

4. The gauge of claim 1 including a sensor for monitoring temperature of the water, and means responsive to the sensor for compensating for temperature dependent variations in the dielectric properties of water in determining the height of the water.

5. In a gauge for monitoring the height of a body of water: a generally planar substrate adapted to be positioned horizontally beneath the water, a pair of electrically conductive plates disposed side-by-side on one side of the substrate to form a capacitor having a capacitance which is dependent upon the amount of water above the plates, and means responsive to the capacitance for determining the height of the water above the plates.

6. The gauge of claim 5 wherein the substrate is part of a printed circuit board, and the plates comprise areas of metal foil on one side of the substrate.

7. In a gauge for monitoring the height of a body of water: a generally planar substrate adapted to be positioned horizontally beneath the water, a pair of electrically conductive plates disposed side-by-side on one side of the substrate to form a capacitor having a capacitance which is dependent upon the amount of water above the plates, the plates being disposed concentrically of each other and including an inner sensor plate and an outer ground plate, and means responsive to the capacitance for determining the height of the water above the plates.

8. The gauge of claim 7 further including a guard plate disposed on the opposite side of the substrate in registration with the sensor plate for protecting the sensor plate from stray capacitances.

9. In a method of monitoring the height of a body of water: positioning a pair of electrically conductive plates side-by-side to form a capacitor having a capacitance which is dependent upon the dielectric properties of materials in a region above the plates, positioning the plates beneath the body of water so that the capacitance is dependent upon the amount of water in the region above the plates, and monitoring the capacitance to determine the height of the water above the plates.

10. The method of claim 9 wherein the height of the water is determined by utilizing the capacitor as a frequency determining element in an oscillator to provide a signal having a frequency corresponding to the capacitance, and monitoring the frequency of the oscillator signal to determine the height of the water.

11. The method of claim 10 wherein the height of the water is determined by providing a table of oscillator frequencies and corresponding water heights, and addressing the table in accordance with the frequency of the oscillator signal to determine the height of the water.

12. The method of claim 10 wherein the oscillator is operated at frequencies on the order of 100 MHz and higher.

13. The method of claim 9 including the steps of monitoring temperature of the water, and compensating for variations in the capacitance due to temperature dependency of dielectric properties of water.

* * * * *